US007772547B2

(12) United States Patent
Verentchikov

(10) Patent No.: US 7,772,547 B2
(45) Date of Patent: Aug. 10, 2010

(54) MULTI-REFLECTING TIME-OF-FLIGHT MASS SPECTROMETER WITH ORTHOGONAL ACCELERATION

(75) Inventor: Anatoli N. Verentchikov, St. Petersburg (RU)

(73) Assignee: Leco Corporation, St. Joseph, MI (US)

( * ) Notice: Subject to any disclaimer, the term of this patent is extended or adjusted under 35 U.S.C. 154(b) by 539 days.

(21) Appl. No.: 11/548,556

(22) Filed: Oct. 11, 2006

(65) Prior Publication Data

US 2007/0176090 A1 Aug. 2, 2007

Related U.S. Application Data

(60) Provisional application No. 60/725,560, filed on Oct. 11, 2005.

(51) Int. Cl.
*B01D 59/44* (2006.01)

(52) U.S. Cl. ....................... 250/287; 250/281; 250/282; 250/283; 250/294; 250/298

(58) Field of Classification Search .......... 250/281-300
See application file for complete search history.

(56) References Cited

U.S. PATENT DOCUMENTS 5,017,780 A * 5/1991 Kutscher et al. ............ 250/287
5,420,425 A * 5/1995 Bier et al. .................... 250/292
5,576,540 A * 11/1996 Jolliffe ....................... 250/292
5,689,111 A 11/1997 Dresch et al.
5,763,878 A * 6/1998 Franzen ...................... 250/292
5,880,466 A * 3/1999 Benner ....................... 250/281
5,955,730 A * 9/1999 Kerley et al. ................ 250/287

(Continued)

FOREIGN PATENT DOCUMENTS

RU 1725289 A1 * 4/1992

(Continued)

OTHER PUBLICATIONS

Boris N. Kozlov Et Al., "Linear Ion Trap with Axial Ejection as a Source for a TOF MS," ASMS 2005.

(Continued)

*Primary Examiner*—Bernard E Souw
*Assistant Examiner*—Michael J Logie
(74) *Attorney, Agent, or Firm*—Price, Heneveld, Cooper, DeWitt & Litton, LLP

(57) ABSTRACT

The disclosed apparatus includes a multi-reflecting time-of-flight mass spectrometer (MR-TOF MS) and an orthogonal accelerator. To improve the duty cycle of the ion injection at a low repetition rate dictated by a long flight in the MR-TOF MS, multiple measures may be taken. The incoming ion beam and the accelerator may be oriented substantially transverse to the ion path in the MR-TOF, while the initial velocity of the ion beam is compensated by tilting the accelerator and steering the beam for the same angle. To further improve the duty cycle of any multi-reflecting or multi-turn mass spectrometer, the beam may be time-compressed by modulating the axial ion velocity with an ion guide. The residence time of the ions in the accelerator may be improved by trapping the beam within an electrostatic trap. Apparatuses with a prolonged residence time in the accelerator provide improvements in both sensitivity and resolution.

35 Claims, 6 Drawing Sheets

U.S. PATENT DOCUMENTS

| | | | | |
|---|---|---|---|---|
| 6,013,913 A * | 1/2000 | Hanson | 250/287 |
| 6,020,586 A * | 2/2000 | Dresch et al. | 250/287 |
| 6,107,623 A * | 8/2000 | Bateman et al. | 250/282 |
| 6,570,152 B1 * | 5/2003 | Hoyes | 250/287 |
| 6,657,190 B2 * | 12/2003 | Hanson et al. | 250/287 |
| 6,680,475 B2 * | 1/2004 | Krutchinsky et al. | 250/281 |
| 6,717,132 B2 * | 4/2004 | Franzen | 250/287 |
| 6,872,941 B1 * | 3/2005 | Whitehouse et al. | 250/288 |
| 6,888,130 B1 * | 5/2005 | Gonin | 250/287 |
| 7,157,698 B2 * | 1/2007 | Makarov et al. | 250/281 |
| 7,351,958 B2 * | 4/2008 | Vestal | 250/287 |
| 7,365,317 B2 * | 4/2008 | Whitehouse et al. | 250/292 |
| 2001/0011703 A1 * | 8/2001 | Franzen | 250/287 |
| 2002/0145109 A1 * | 10/2002 | Doroshenko | 250/287 |
| 2004/0113064 A1 * | 6/2004 | Fuhrer et al. | 250/287 |
| 2004/0159782 A1 * | 8/2004 | Park | 250/282 |
| 2004/0222369 A1 * | 11/2004 | Makarov et al. | 250/281 |
| 2004/0232327 A1 | 11/2004 | Bateman et al. | |
| 2004/0238755 A1 * | 12/2004 | Lee et al. | 250/423 R |

FOREIGN PATENT DOCUMENTS

WO WO 2005001878 A2 1/2005

OTHER PUBLICATIONS

Boris Kozlov Et Al., "Space Charge Effects in Multireflecting Time-of Flight Mass Spectrometer," ASMS 2005.

Boris Kozlov, Et Al., "Effect of Pushing Pulse Rise Time on Precision of Mass Calibration in TOF MS," ASMS 2006.

Takaya Satoh, Et Al., "The Design and Characteristic Features of a New Time-of-Flight Mass Spectrometer with a Spiral Ion Trajectory," J Am Soc Mass Spectrom 2005, 16, 1969-1975.

Michisato Toyoda, Et Al., "Multi-turn time-of-flight mass spectrometers with electrostatic sectors," J. Mass Spectrom 2003; 38: 1125-1142.

A. N. Verentchikov, Et Al., "Multireflection Planar Time-of-Flight Mass Analyzer. I & II," Technical Physics, vol. 50, No. 1, 2005, pp. 73-81 and pp. 82-86.

* cited by examiner

MULTI-REFLECTING TIME-OF-FLIGHT MASS SPECTROMETER WITH ORTHOGONAL ACCELERATION

CROSS-REFERENCE TO RELATED APPLICATION

This application claims the benefit of U.S. Provisional Application No. 60/725,560, filed on Oct. 11, 2005, the entire disclosure of which is incorporated herein by reference.

BACKGROUND OF THE INVENTION

The invention generally relates to the area of mass spectroscopic analysis, and more particularly is concerned with method and apparatus, including multi-reflecting time-of-flight mass spectrometer (MR-TOF MS) and with the apparatus and method of improving the duty cycle of the orthogonal injection at a low repetition rate.

Time-of-flight mass spectrometers (TOF MS) are increasingly popular, both as stand-alone instruments and as a part of mass spectrometry tandems like a Q-TOF or a TOF-TOF. They provide a unique combination of high speed, sensitivity, resolving power (resolution) and mass accuracy. Recently introduced multi-reflecting time-of-flight (MR-TOF) mass spectrometers demonstrated a substantial raise of resolution above $10^5$ (See the publication entitled "Multi-Turn Time-of-Flight Mass Spectrometers with Electrostatic Sectors" by Michisato Toyoda, Daisuke Okumura, Morio Ishihara and Itsu Katakuse, published in *J. Mass Spectrom.* 38 (2003) pp. 1125-1142, and the publication by Verentchikov et al. published in the *Russian Journal of Technical Physics* (JTP) in 2005 vol. 50, No. 1, pp. 76-88).

In a co-pending international PCT patent application by the inventors (WO 2005/001878 A2), the entire disclosure of which is incorporated herein by the reference, there was suggested an MR-TOF with planar geometry and a set of periodic focusing lenses. The multi-reflecting scheme provides a substantial extension of the flight path and thus improves resolution, while the planar (substantially 2-D) geometry allows the retention of full mass range. Periodic lenses located in a field-free space of the MR-TOF provide a stable confinement of ion motion along the main jig-saw trajectory. To couple the MR-TOF to continuous ion beams, gas-filled radio frequency (RF) ion traps were proposed to accumulate ions in between sparse pulses of the MR-TOF.

However, as shown in an ASMS presentation (Abstracts of ASMS 2005 and ASMS 2006 by B. N. Kozlov et. al.), an ion trap source introduces at least two significant problems: 1) ion scattering on gas; and 2) space charge effects on ion beam parameters. Those factors limit an ion current, which could be converted into ion pulses. Experiments with storing ions near the exit of an RF ion guide show that ionic space charge starts affecting parameters of ejected ions when the number of stored ions exceeds N=30,000. Similar estimates have been obtained in the literature for linear ion traps and 3-D (Paul) traps. Gas scattering requires operation at a gas pressure below 1 mtorr which, in turn, requires dampening time in the order of T=10 ms, i.e., limiting pulsing repetition rate by F=100 Hz (Abstracts of ASMS 2005 and ASMS 2006 by B. N. Kozlov et. al.). All together it means that an ion flux above N*F=3,000,000 ions/s (corresponding to a current I=0.5 pA) will be affecting the turnaround time and the energy spread of ejected ions. This current is at least a factor of 30 lower compared to the intensity of modem ion sources, like ESI and APCI. If no measures are taken, the resolution and mass accuracy of the TOF MS would depend on ion beam intensity and, thus, on parameters of the analyzed sample. For tandems with chromatography like a liquid chromatographic mass spectrometer (LC-MS) and a liquid chromatographic tandem mass spectrometer (LC-MS-MS), it would mean that mass scale would be shifted at a time of elution of chromatographic peaks. An automatic adjustment of peak intensity would stabilize mass scale, but will introduce additional ion losses and limit a duty cycle of the trap (efficiency of converting continuous ion beams into ion pulses) to several percent.

The use of a linear ion trap instead of a three-dimensional ion trap (see U.S. Pat. No. 5,763,878 by J. Franzen) would reduce space charge effects. The linear trap is known to produce ion bunches with up to $10^6$ ions per bunch (LTQ-FTMS). The solution still has drawbacks related to ion scattering on gas, slow pulsing and, as a result, a large load on the detector and the data acquisition system, currently known to have a limited dynamic range.

A method of orthogonal pulsed acceleration is widely used in time-of-flight mass spectrometry (oa-TOF MS). It allows converting a continuous ion beam into ion pulses with a very short time spread down to 1 ns. Because of operating with a low diverging ion beam, a so-called turnaround time drops substantially. Due to a high frequency of pulses (10 kHz) and because of an elongated ion beam, the efficiency of the conversion (so-called duty cycle) in a conventional oa-TOF is quite acceptable while space charge problems are avoided. In a singularly reflecting TOF (a so-called "reflectron") the duty cycle of the orthogonal accelerator is known to be in the order of K=10-30% for ions with highest m/z in the spectrum (dropping proportional to the square root of m/z for other ions).

Unfortunately, the conventional orthogonal acceleration scheme is poorly applicable to MR-TOF because of two reasons:

a) longer flight times (1 ms) and lower repetition rate would reduce the duty cycle by more than an order of magnitude; and b) a smaller acceptance of the analyzer to ion packet width in the drift direction would require a short length of ion packet limited by the aperture of periodic focusing lenses (this length is estimated to be below 5-7 mm) which would limit duty cycle again.

The overall expected duty cycle of an MR-TOF with a conventional orthogonal accelerator is under 1 percent.

The duty cycle of an orthogonal accelerator can be improved in a so-called "pulsar" scheme (such as that disclosed in U.S. Pat. No. 6,020,586 by T. Dresch) at the cost of reducing mass range. The scheme suggests trapping ions in a linear ion guide and releasing ions periodically. Orthogonal accelerator is synchronized to release pulses. The scheme also introduces a significant energy spread in the direction of continuous ion beam. The benefit of the scheme is marginal, even in case of prolonged flight times.

The mass range in a "pulsar" scheme can be extended by application of a time-dependent electrostatic field, which bunches ions of different masses at the position of the orthogonal accelerator (see, for example, U.S. Patent Application Publication No. US 2004/0232327 A1). This solution, however, is not suitable for ion injection into an MR-TOF MS because ions of different masses gain different energies during bunching and thus are orthogonally accelerated under essentially different angles with respect to the direction of the continuous ion beam. Such a large angular spread cannot be accepted by the MR-TOF MS.

Summarizing the above, a planar multi-reflecting analyzer significantly improves resolving power while providing a full mass range. However, ion sources of the prior art do not provide a sufficient duty cycle above several percent, or suffer other drawbacks. Accordingly, there is a need for instrumentation simultaneously providing high resolution and an efficient conversion of ion flux into ion pulses.

SUMMARY OF THE INVENTION

According to one aspect of the present invention, a multi-reflecting time-of-flight mass spectrometer (MR-TOF MS) is provided that comprises: an ion source for generating an ion beam; an orthogonal accelerator to convert the ion beam into ion packets; and a planar multi-reflecting analyzer providing multiple reflections of the ion packets within a jig-saw trajectory plane, wherein the ion beam is oriented substantially across the trajectory plane.

According to another aspect of the invention, an MR-TOF MS comprises a radio frequency and gas-filled ion guide that may, for example, be placed in between an ion source and a TOF or an orthogonal accelerator, the ion guide having means for periodic modulation of axial velocity of ions to achieve a well-conditioned quasi-continuous ion flow synchronized with pulses of the orthogonal acceleration. The time modulation may be accompanied by rapid ion delivery from the ion guide into the orthogonal accelerator by using a substantial acceleration of ions in the transfer ion optics with subsequent deceleration right in front or within the orthogonal accelerator.

According to another aspect of the invention, a multi-reflecting time-of-flight mass spectrometer (MR-TOF MS), comprises: an ion source for generating an ion beam; an orthogonal accelerator to convert the ion beam into ion packets; an interface for ion transfer between the ion source and the orthogonal accelerator; and a multi-reflecting analyzer providing multiple reflections of the ion packets within electrostatic fields, wherein the orthogonal accelerator comprises an electrostatic trap.

According to another aspect of the invention, a method of multi-reflecting time-of-flight mass spectrometry comprises the steps of: forming an ion beam; forming ion packets by applying a pulsed electric field in a substantially orthogonal direction to the ion beam; introducing the ion packets into a field-free space in between ion mirrors, the ion mirrors forming a substantially two-dimensional electric field, extended along a drift axis; and orienting the pulsed electric field substantially orthogonal to the drift direction such that the ion packets experience multiple reflections combined with slow displacement along the drift direction, thus forming a jig-saw ion path within a trajectory plane, wherein the ion beam travels substantially orthogonal to the trajectory plane.

According to another aspect of the invention, a method of multi-pass time-of-flight mass spectrometry comprises the steps of: forming an ion beam; delivering the beam to a region of ion packet formation; forming ion packets by applying a pulsed electric field in a substantially orthogonal direction to the ion beam; and introducing the ion packets into an electrostatic field of a multi-reflecting time-of-flight analyzer, such that the ion packets experience multiple reflections, wherein the step of ion beam delivery further comprises a step of time-modulating the intensity of the ion beam by axial electric field within an ion guide at an intermediate gas pressure, the modulation is synchronized to orthogonal electric pulses.

According to another aspect of the invention, a method of multi-pass time-of-flight mass spectrometry comprises the steps of: forming an ion beam; delivering the ion beam to a region of ion packet formation; forming ion packets by applying a pulsed electric field in an electrostatic trap in a substantially orthogonal direction to the ion beam; and introducing the ion packets into an electrostatic field of a multi-reflecting time-of-flight analyzer, such that the ion packets experience multiple reflections, wherein the step of ion beam delivery into the pulsed electric field of the electrostatic trap further comprises a step of ion trapping in an electrostatic field and wherein at least a portion of trapped ions remains in a region of pulsed acceleration.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
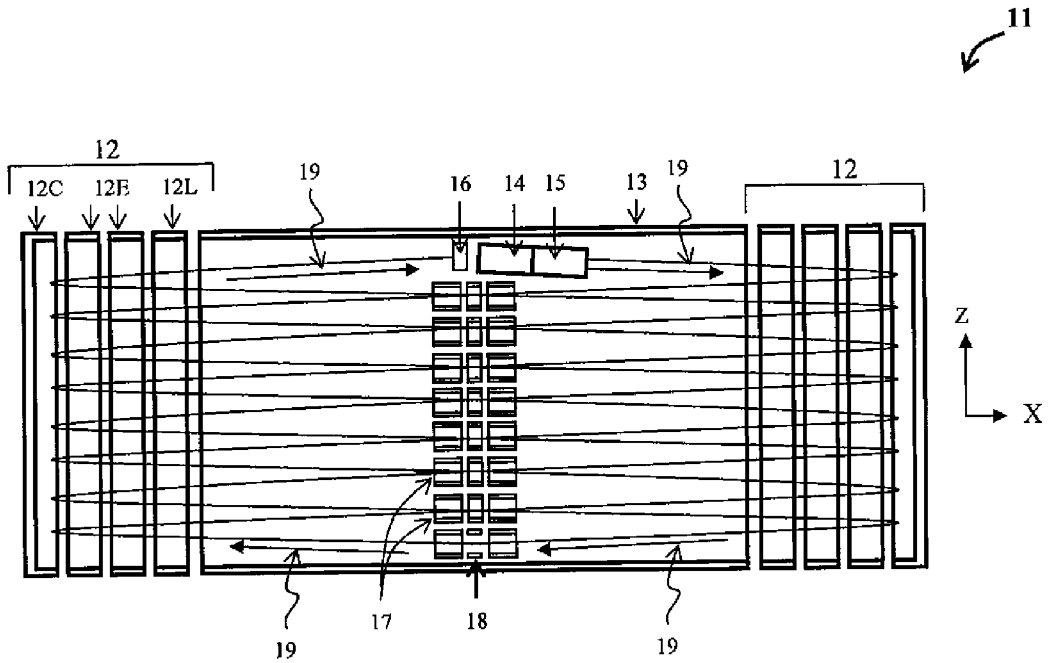
FIG. 1 presents a top view of a first embodiment of the MR-TOF analyzer with an orthogonal accelerator.
Figure 2:
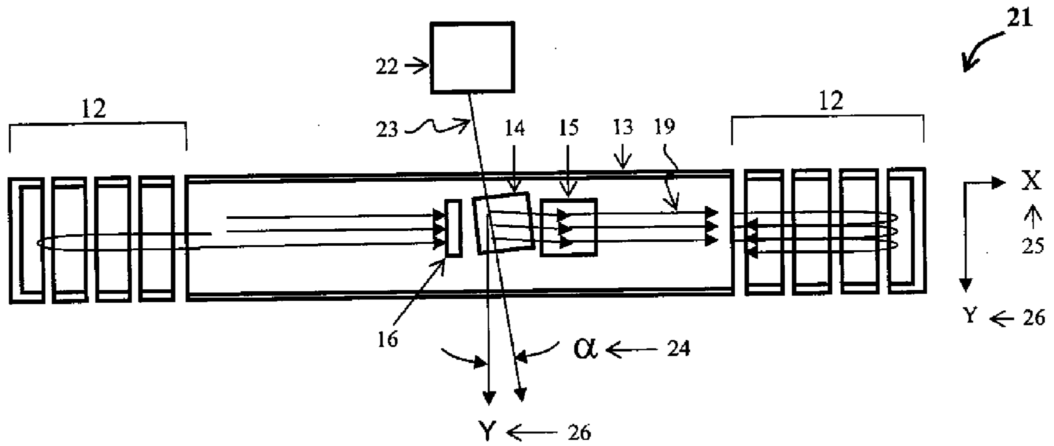
FIG. 2 shows a side view of the first embodiment with ion introduction substantially transverse to the ion trajectory plane.

The inventors have found multiple related ways of improving the duty cycle of orthogonal injection into the MR-TOF MS. For one, the continuous ion beam may be oriented substantially across the plane of the jig-saw folded ion path, which will allow extending the length of ion packets in the orthogonal accelerator. The ion beam is slightly tilted to normal axis, and ion packets are steered back into the symmetry plane of the folded ion path, thus mutually compensating time distortions of the tilt and the steering (FIGS. 1 and 2).

According to the first aspect of present invention, a multi-reflecting time-of-flight mass spectrometer (MR-TOF MS) comprises: an ion source for generating an ion beam; a subsequent orthogonal accelerator (OA) to convert said ion beam into ion packets; a pair of parallel electrostatic mirrors (orthogonal to axis X); and substantially extended in one direction (Z) to provide a non-overlapping jig-saw path, wherein said ion beam and said accelerator are oriented to provide said ion packets being elongated substantially in the Y-direction across said jig-saw trajectory (X-Z plane).

The inventors also realized that the duty cycle of any multi-reflecting or multi-turn TOF with an orthogonal accelerator could be further improved by forming a quasi-continuous ion flow through a transport ion guide, wherein modulations of such flow are time correlated with pulses in an orthogonal accelerator. Such modulations may be achieved, for example, by modulation of a gentle axial electric field in at least some portion of the ion guide.

According to the second aspect of the invention, an MR-TOF MS comprises a radio frequency and gas-filled ion guide that may, for example, be placed in between an ion source and a TOF or an orthogonal accelerator, the ion guide having means for periodic modulation of axial velocity of ions to achieve a well-conditioned quasi-continuous ion flow synchronized with pulses of the orthogonal acceleration. The time modulation may be accompanied by rapid ion delivery from the ion guide into the orthogonal accelerator by using a substantial acceleration of ions in the transfer ion optics with subsequent deceleration right in front or within the orthogonal accelerator.

The inventors further realized that the duty cycle of the orthogonal accelerator in any multi-reflecting or multi-turn TOF could be further improved by using multiple ion reflections within the orthogonal accelerator during the phase of propagation of continuous (or quasi-continuous) ion beam.

According to the third aspect of the invention, an MR-TOF comprises an electrostatic trap within an orthogonal accelerator. As an example, the electrostatic trap is formed by miniature parallel planar electrostatic mirrors, which are separated by a drift space having a window to accelerate ions orthogonally to the trap axis. The electrostatic trap allows a jig-saw motion with multiple ion reflections between mirrors before extracting ions through the mesh/slit by electric pulse. Alternatively, the electrostatic mirrors can be axially-symmetric and arranged coaxially, such that ion motion between the mirrors prior to orthogonal extraction is a shuttle-type one.

The invention is particularly well-suited for planar MR-TOF MS described in co-pending PCT Patent Application No. WO 2005/001878 A2. In this MR-TOF MS, the electric field of the ion mirrors is preferably arranged to provide for high order spatial and time-of-flight focusing with respect to ion energy and to spatial and angular spread across the trajectory plane, the latter allowing acceptance of ion packets extended across the plane. The MR-TOF may have a set of periodic lenses in the drift space to confine ions to the central folded trajectory. The MR-TOF MS may have a deflector to reflect ions in the drift direction, thus doubling the length of the folded ion path.

The invention is applicable to all known ion sources, including continuous, quasi-continuous and pulsed ion sources, both vacuum sources and gas-filled ones. The gas-filled ion sources may be coupled to the orthogonal accelerator via a gas-filled and RF ion guide. In the case that continuous ion sources, like ESI, APCI, EI, ICP, are used, the ion guide may have means for modulating the axial electric field (second aspect of the invention). In the case that pulsed ion sources, like UV or IR MALDI, are used, a quasi-continuous ion beam is naturally formed by using an ion guide with a constant axial field. In this case pulses of the ion source are synchronized to pulses of the orthogonal extraction with account for ion transport delay. Vacuum ion sources, like EI, CI, FT, could be used either directly or with an intermediate conditioning of ions in the ion guide with a modulated axial field.

The invention is applicable to multiple tandems, including tandems with chromatography and electrophoresis like LC-TOF, CE-TOF, LC-MS-TOFMS, as well as double mass spectrometry systems like Q-TOF, LIT-TOF and TOF-TOF, while including the MR-TOF MS of the invention in at least one stage.

Referring to FIG. 1, the top view in the X-Z plane of the first embodiment of the MR-TOF MS 11 with an orthogonal ion accelerator is shown. As depicted, the MR-TOF MS may comprise a pair of grid-free ion mirrors 12, a drift space 13, an orthogonal ion accelerator 14, an optional deflector 15, an ion detector 16, a set of periodic lenses 17, and an edge deflector 18. Each ion mirror 12 may comprise planar and parallel electrodes 12C, 12E and 12L. Drift space 13 accommodates elements 14 to 18. FIG. 1 also shows a central ion trajectory 19 oriented substantially along the X-Z plane of the drawing.

Also referring to FIG. 2, which shows the side view 21 in the X-Y plane, the first embodiment of the MR-TOF comprises a generic ion source 22 generating an ion beam 23. The view also specifies axes X-25 and Y-26, wherein the Y-axis is oriented orthogonal to the ion trajectory plane. It also shows an ion beam being tilted to the Y-axis at a small angle $\alpha$—denoted as 24. The preferred angle $\alpha$ is less than 10 degrees, a more preferred is less than 5 degrees, and even more preferred angle is less than 3 degrees. In other words, the initial beam is introduced substantially orthogonal (i.e., normal) to the plane of ion trajectory in the MR-TOF analyzer. Details of the ion beam orientation are discussed below.

The above combination of planar and grid-free ion mirrors 12 with periodic lenses 17 form a multi-reflecting TOF mass analyzer, described in co-pending PCT Patent Application No. WO 2005/001878 A2, the entire disclosure of which is incorporated herein by reference. The analyzer is characterized by multiple reflections of ion packets by ion mirrors 12 (here in the X direction) and slow drift (here in the Z direction), thus forming a jig-saw ion trajectory parallel to the X-Z plane. The ion drift and confinement along the central trajectory 19 may be enforced by a set of periodic lenses 17. The edge deflector allows doubling the ion path. The analyzer is capable of high order spatial and time-of-flight focusing and provides a substantial extension of flight path while preserving full mass range. Details of ion introduction into the MR-TOF MS are one subject of the present invention.

In operation, ion source 22 forms an ion beam 23 in a continuous, quasi-continuous or a pulsed form. The ion beam is introduced substantially along the Y direction, e.g., substantially across the X-Z plane (also referred to as the trajectory plane), at an angle $\alpha$ less than 10 degrees, preferably less than 5 degrees, and more preferably less than 3 degrees. The ion beam is converted into ion packets 19 by periodic electric pulses in orthogonal accelerator 14, thereby ejecting ion packets substantially along the X direction. By principle of operation of the orthogonal accelerator described elsewhere, the formed ion packets appear extended along the Y direction and depending on the particular embodiment may be slightly tilted to the Y direction. Deflector 15 steers ions parallel to the X-Z trajectory plane. Ions experience multiple reflections in the X direction while slowly drifting in the Z direction, thus forming a jig-saw ion trajectory in the X-Z plane. After being focused by periodic lenses 17 and deflected by deflector 18, ion packets reach detector 16 for recoding time-of-flight spectra.

In the prior art method of orthogonal acceleration (described elsewhere) the ion beam is expected to be aligned with the drift Z-direction. In such a case, the initial velocity of the ion beam along the Z direction would remain the same regardless of the orthogonal acceleration in the X direction, since two orthogonal motions remain independent (principle of Galileo). The initial motion of the ion beam would translate into a slow drift of ion packets naturally causing their displacement in the drift direction and, thus, forming a trajectory plane. A natural orientation of the ion beam along the Z-axis, however, would limit the length of ion packets and number of reflections within the MR-TOF. Moreover, extended ion packets in the Z direction are distorted by periodic lenses thus blurring the time signal at the detector.

The present invention suggests an alternative orientation of the ion beam—across the trajectory plane (here, substantially along the Y-axis)—which appears to provide multiple benefits when used with MR-TOF analyzers and particularly with planar MR-TOF analyzers. Such orientation provides a narrow and low diverging ion beam in the most critical time-of-fight X direction—a property of conventional orthogonal acceleration scheme. The planar MR-TOF analyzer has a high acceptance in the Y direction (across the jig-saw trajectory plane) still providing high order time focusing with respect to coordinate ion spread in this direction. Therefore, the suggested orientation of the orthogonal accelerator would allow increasing the length of ion packets (compared to conventional orientation), thus improving the duty cycle. Narrow beam width in the Z direction allows a very small period of lenses 17 and a very dense folding of ion path which also further improves the gain in the ion path. Narrow beam width and small advance (displacement) per reflection would reduce time distortions within periodic lenses 17 and within deflectors of the MR-TOF MS. The suggested orientation of ion beam across the jig-saw trajectory plane, however, may introduce a problem. Initial ion beam velocity introduces a velocity component of ion packets along the Y-axis, causing displacement from the central trajectory plane (the symmetry plane of the mirrors). It may thus be desirable to steer the ion packets back into the trajectory plane. However, this may introduce significant time distortions.

A technique for steering long ion packets without significant time distortions is now discussed with reference to FIG. 2. The ion beam 23 and accelerator 13 may be tilted with respect to axis Y at a small angle α—(24), while the energy of ions in the continuous ion beam $\epsilon_y$ and the acceleration voltage $U_{acc}$ in the MR-TOF MS are chosen such that $$\tan^2(2\alpha)=\epsilon_y/qU_{acc} \quad (1)$$

Figure 3:
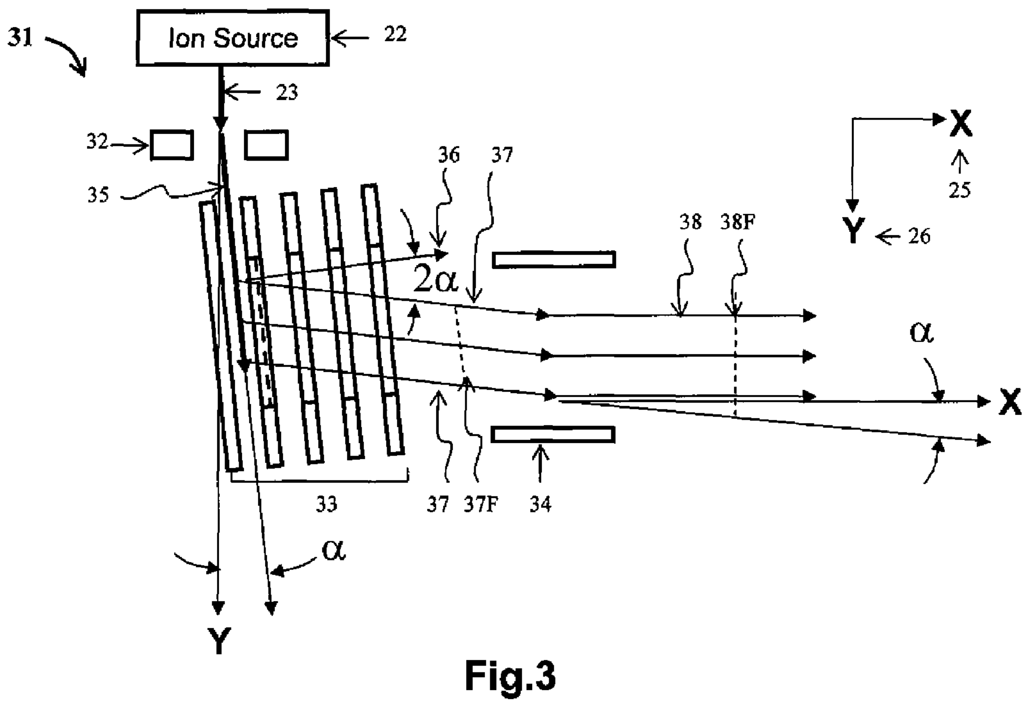
FIG. 3 shows a schematic of an orthogonal accelerator and an ion deflector in the first embodiment of the MR-TOF analyzer.

Referring to FIG. 3, the MR-TOF with a tilted accelerator 31 may comprise an ion source 22, an optional steering device 32 for the ion beam, a tilted accelerator 33, and a deflector 34. The components are oriented to axes X-25 and Y-26 as shown in the drawing.

In operation, ion source 22 may produce an ion beam 23 that is continuous, quasi-continuous, or pulsed. Ion source 22 may be oriented at a small angle α to the Y-axis (not shown) or the beam may be steered by steering device 32, such that the final ion beam 35 becomes tilted at angle α to the Y-axis. Plates of orthogonal accelerator 33 may be aligned parallel to ion beam 35, i.e., also tilted to the Y-axis at angle α. It also means that the normal to beam direction 36 is tilted to the X-axis at the same angle α. The energy $\epsilon_y$ of continuous ion beam 23 and acceleration potential of the orthogonal accelerator $U_{acc}$ are chosen according to the equation (1). In this case the ejected ion packets 37 will follow a trajectory tilted to the normal 36 at the angle 2α and tilted to the X-axis at angle α. The ion packets (iso-mass fronts) will be aligned parallel to the plates of orthogonal accelerator 33 as 37F, i.e., tilted to Y-axis at angle α. Potentials of the steering device, here shown as a pair of deflection plates 34, are adjusted to steer the beam at angle α, such that ions are redirected straight along the jig-saw trajectory. After passing through deflector 34, time fronts appear to be turned exactly orthogonal to the jig-saw trajectory, which minimizes overall time distortions. Note that individual distortions of tilting the beam and of ion steering could be substantial. As a working example, in case of 5 kV acceleration and α=2 degrees, the energy of the ion beam should be chosen as 20 eV. If using 1 cm long ion packets, the individual time distortions would reach 10 ns for ions with m/z=1000. The suggested method provides mutual compensation of time distortions caused by tilting and steering. Computer simulations with the aid of the program SIMION 7.0 suggest that the overall time distortion may be reduced below 1 ns.

Figure 4:
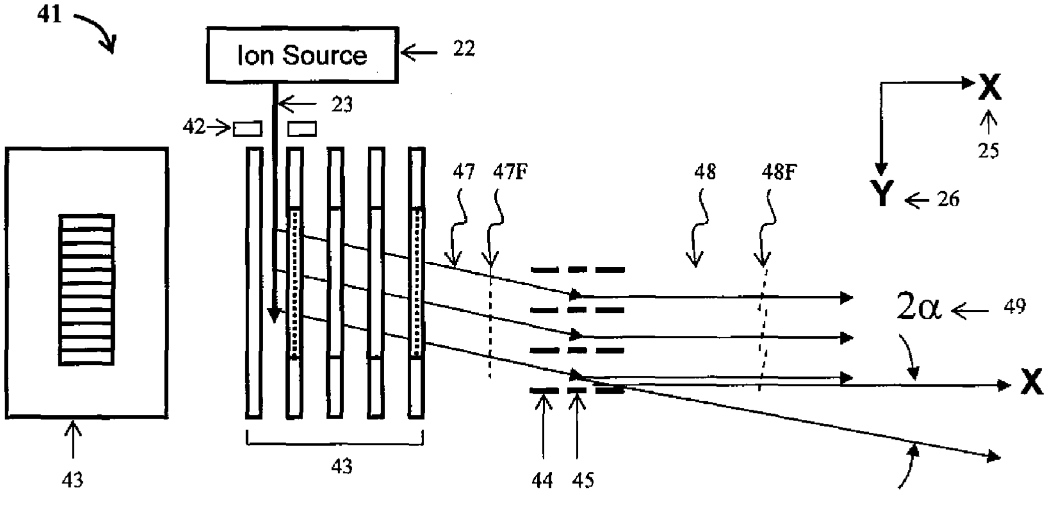
FIG. 4 shows another embodiment of an orthogonal accelerator and an ion deflector.

Referring to FIG. 4, an alternative method of ion packet steering relies on deflecting within multiple and small size deflectors. The MR-TOF of this particular embodiment may be similar to that shown in FIGS. 1 and 2 and may further comprise an ion source 22, an orthogonal accelerator 43 and a set of multiple steering plates 45 with optional termination plates 44 as shown in FIG. 4. Plates 44 and 45 may be aligned to the Y-axis, which is exactly orthogonal to the ion trajectory plane X-Z. The ion beam 23 is aligned exactly parallel to the Y-axis by an optional steering device 42. The ion beam is transformed into ion packets 47 by electric pulses applied to accelerator plates. The ion packets then travel at angle 2α to the X-axis (i.e., 4 degrees in the numerical example). To return the beam into the trajectory plane, the beam may be steered within multiple deflectors 45. Reducing time distortion below 1 ns for ions with m/z=1000 may require a very dense set of deflectors with a period<0.5 mm. After steering of the 0.5 mm long beam at the angle 2α=4 deg, there will appear a 30 μm distortion of time front, equivalent to 1 ns time spread.

The orthogonal accelerator of the invention may be arranged to minimize ion scattering on meshes. In one particular example (FIG. 3), the exit mesh of accelerator 43 may be replaced by an einzel lens, which is tuned to compensate for spatial divergence of the ion packets. In another particular example (FIG. 4), the exit mesh is made of wires, which are parallel to the trajectory plane. Such wire orientation allows the ion beam to be kept narrow in the drift Z direction.

It should be noted that orientation of the beam across the trajectory plane is particularly advantageous for a multi-reflecting TOF such as the multi-reflecting TOFs described in co-pending patents of the inventors or such as a multi-turn TOF described in Toyoda M., Okumura D., Ishihara M., Katakuse I., *J. Mass Spectrometry*, vol. 38 (2003) pp. 1125-1142 and T. Satoh, H. Tsuno, M. Iwanaga, Y. J. Kammei, *Am. Soc. Mass Spectrometry*, vol. 16 (2005) pp. 1969-1975. In the first case, the electrostatic field of the analyzer is formed by ion mirrors and in the second case of multi-turn systems, by electrostatic sectors. However, a singularly reflecting TOF MS will gain as well. Such orientation of the ion beam allows using a prolonged accelerator and prolonged deflector, thus improving the duty cycle of the TOF MS.

To further improve the duty cycle of the orthogonal accelerator in any multi-reflecting or multi-turn TOF, an ion guide may be used, and the axial ion velocity within the guide may be modulated.

Figure 5:
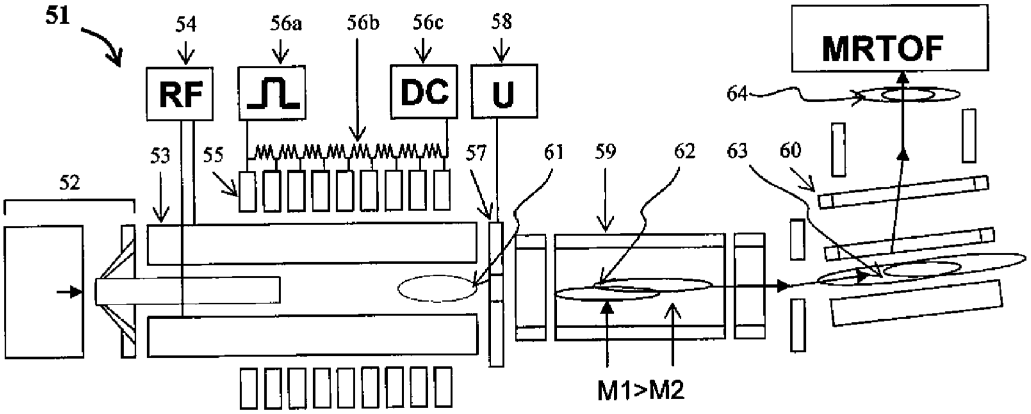
FIG. 5 shows a schematic of ion modulation within the ion guide in the first embodiment of the MR-TOF.

Referring to FIG. 5, another embodiment of an MR-TOF 51 may comprise an ion source 52, a set of multipole rods 53, a set of auxiliary electrodes 55, an exit aperture 57, and a lens 59 for rapid ion transfer into an orthogonal accelerator 60 of the MR-TOF MS. To generate an RF field, the multipole rods are connected to an RF signal generator 54. To generate a pulsed axial field, a pulsed supply **56*a* is connected to a first auxiliary electrode, a DC supply 56*c* is connected to a last auxiliary electrode, and a signal is distributed between other auxiliary electrodes via a chain 56*b*** of dividing resistors. To sustain short rise time of pulses (below 10 μs) in the presence of up to 100 pF stray capacitance, the resistors are selected below 10 kΩ.

In operation, the electric field of auxiliary electrodes 55 penetrates through the gap between electrodes of the ion guide 53 thus creating a weak axial electric field. Such field is turned on only at the time of generator **56*a* pulses. Without pulses the axial field vanishes or strongly diminishes except at the very end where ions are sampled through the exit aperture 57 with a constant extracting potential. A continuous or quasi-continuous ion beam comes from the ion source 52, here shown as an Electrospray ion source 52**. Ions enter a gas-filled multipole ion guide at a gas pressure P and length L, exceeding P*L>10 cm*mtor, which ensures a thermalization, or dampening of ions to almost a complete stop. Slow gas flow and self space charge drive ions at a moderate velocity, measured elsewhere around 10-30 m/s (1-3 cm/ms). Alternatively, a slow propagation velocity is controlled by a weak axial field at the filling time between pulses. The first portion of the ion guide dampens ions. The second portion of the guide is equipped with auxiliary electrodes to modulate axial field in time. Note that the arrangement allows independent application of an RF signal and pulsed potentials to different sets of electrodes.

At a fill stage, the axial field is switched off or reduced. The fully dampened ion beam propagates slowly and parameters of the ion guide are selected such that the beam fills the entire length of the guide. At a sweep stage, a pulse is applied to auxiliary electrodes, which generates a weak axial field that helps the ion propagation, thus temporarily increasing ion flux near the exit aperture 57. A quasi-continuous ion flow 61 is rapidly transferred by ion lens 59 to minimize time-of-flight separation of ions of different masses before introducing the flow into the orthogonal accelerator 60 of the TOF MS. Compared to a fully continuous regime, the ion flux is compressed by at least 10-fold which is defined by a ratio of axial ion velocities at sweep-and-fill stages. The quasi-continuous beam 61 is accelerated in the lens 59 and then decelerated and steered immediately in front of the orthogonal accelerator 60. Ion optics properties of the lens are adjusted to generate a nearly parallel quasi-continuous ion beam in the accelerator. A partial time-of-flight separation occurs in the lens and in the orthogonal accelerator, but since the transfer time (10-20 μs) is shorter than the duration of quasi-continuous ion beam 61 (50-100 μs), such partial separation still leaves overlapping beams of different masses. The overlapping is shown by ion beam contours at different times corresponding to ion beam location 62 within the lens 59 and to ion beam location 63 within the orthogonal accelerator 60. A synchronized and slightly delayed (compared to sweep pulse 56*a*) electric pulse is applied to the electrodes of the accelerator 60 at the time of ion beam passage through the accelerator. A portion of the quasi-continuous ion beam 63 becomes converted into short ion packets 64 traveling towards MR-TOF.

As a working example, parameters of the MR-TOF with a modulated axial velocity are selected as follows: gas pressure is 25 mtorr, the length of the ion guide is preferably 15 cm, and the length of the velocity modulated area is 5 cm. The pulsing rate of HRT is 1 kHz and amplitude of the axial field potential is several volts (actual pulse amplitude depends on efficiency of field penetration). Such parameters are chosen to fully convert ion beam into a quasi-continuous beam.

Figure 6:
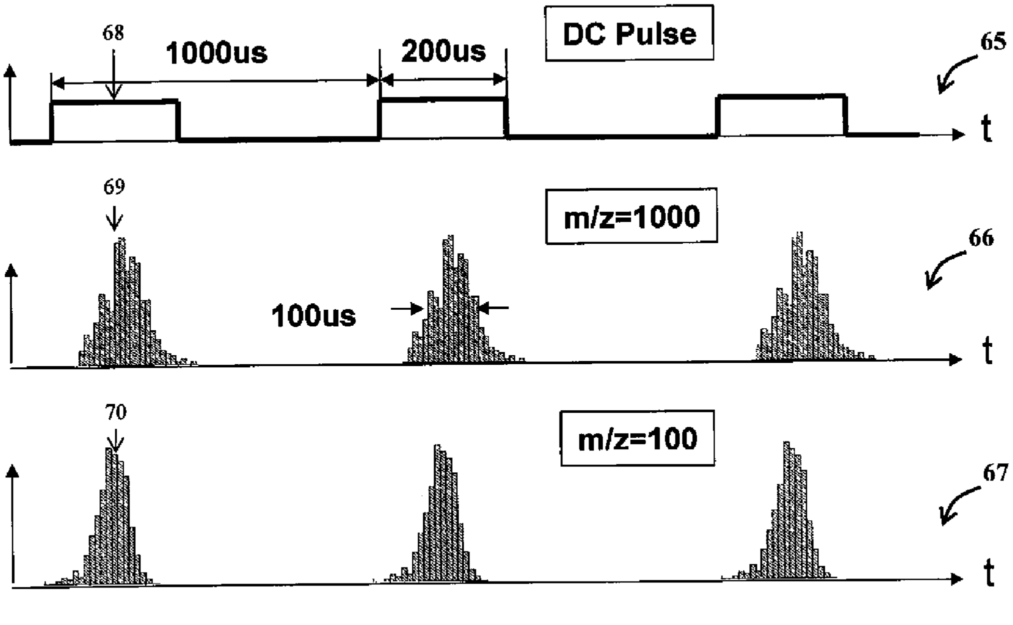
FIG. 6 shows time diagrams for ion modulation within the ion guide.

Referring to FIG. 6, results of SIMION ion optical simulations confirm the effect of ion flux compression at the example of a 10 cm ion guide filled at 25 mtorr gas pressure. Simulations account for 3-D fields—the RF field and the DC field of auxiliary electrodes. They also account for ion-to-gas collisions and slow wind of gas flow at 30 m/s velocity. The strength of the axial field is selected to drag ions at about 300-500 m/s velocity. The diagram 65 shows an axial field pulse 68 being applied with a period of 1200 μs and duration of 200 μs. The time signal of ions with m/z=1000 (plot 66) and m/z=100 (plot 67) show time dependent modulation of ion flux 69 and 70 with significant compression and sufficient time overlapping. This means that ions of both masses will be present within a quasi-continuous flow 63 within the accelerator, so the mass range of the described compression method is expected to be at least one decade of mass. A typical duration of quasi-continuous flow is about 100 μs. In the particularly simulated example, the gain in ion flux reaches a factor of 12. Simulations also suggest that though axial energy may reach a fraction of electron-volt, the radial energy is still well dampened, which is important for reducing the turn around time and creating short ion packets 64 at the exit of the orthogonal accelerator 60.

The above simulation shows an advantage of the method described herein of velocity modulation compared to an earlier suggested method of ion trapping and releasing within the ion guide as described in U.S. Pat. No. 5,689,111. The prior art suggests modulating potential of the exit aperture 58 of the ion guide. The '111 patent describes the process as ion free traveling within the guide and periodic bouncing from a repelling potential. However, in reality, the ion space charge and gas wind push ions towards the exit end of the ion guide. As a result, ions get stored near the exit and accumulate space charge, which is likely to affect parameters of ejected ions at a prolonged storage. Therefore, the prior art method referred to is poorly compatible with MR-TOF having long flight times. Since ions are stored within a substantially three-dimensional field, an application of ejection pulses to an exit aperture causes spreads of both axial and radial ion energies. Accumulation of ions near the exit is also responsible for a short duration ion pulse at the exit of the ion guide. As a result, the mass range of the prior art method rarely reaches 2. To the contrary, in the present invention, a weak axial field (0.3-0.5 V/cm) reduces space charge and corresponds to best ion conditioning employed in steady state ion guides for TOF MS. The mass range is expected to reach at least a decade of mass as is seen from simulations.

Although the inventive method of velocity modulation is best-suited for multi-reflecting and multi-turn TOF MSs with prolonged flight times (1 ms and above), it may be used with conventional TOF MSs.

One skilled in the art could apply a variety of known methods of affecting axial ion velocity. A pulsed axial field may be formed by applying a distributed electric pulse to a set of ring electrodes sitting in between short multipole sets, supplied with RF voltage. The arrangement works particularly well when the ring opening is about the size of the multipole clearance. Similarly, larger size auxiliary ring electrodes may surround a single elongated multipole set. A pulsed axial electric field may be formed by applying an electric pulse to auxiliary electrodes having the shape of a curved wedge, such that the electrostatic penetrating field would vary approximately linearly along the axis. In this case, a number of auxiliary electrodes can be minimized. The described arrangements with various auxiliary electrodes allow applying pulsed and RF voltages to different sets of electrodes. If using a non-resonance RF circuit, it may become possible to apply pulses and RF voltages to the same sets of electrodes. Then, a pulsed electric field may be formed in between tilted rods or conical shaped rods or in a segmented (rectilinear) multipole with a wedge shaped opening. The axial ion velocity may be modulated by a pulsed gas flow or by an axially propagating wave of a non-uniform RF field or of an electric field, the latter being formed within a set of rings.

Another complimentary method of further improving duty cycle of the orthogonal accelerator for any multi-reflecting or multi-turn TOF MS is to use an electrostatic trap for a prolonged retention of an ion beam within the accelerator.

Figure 7:
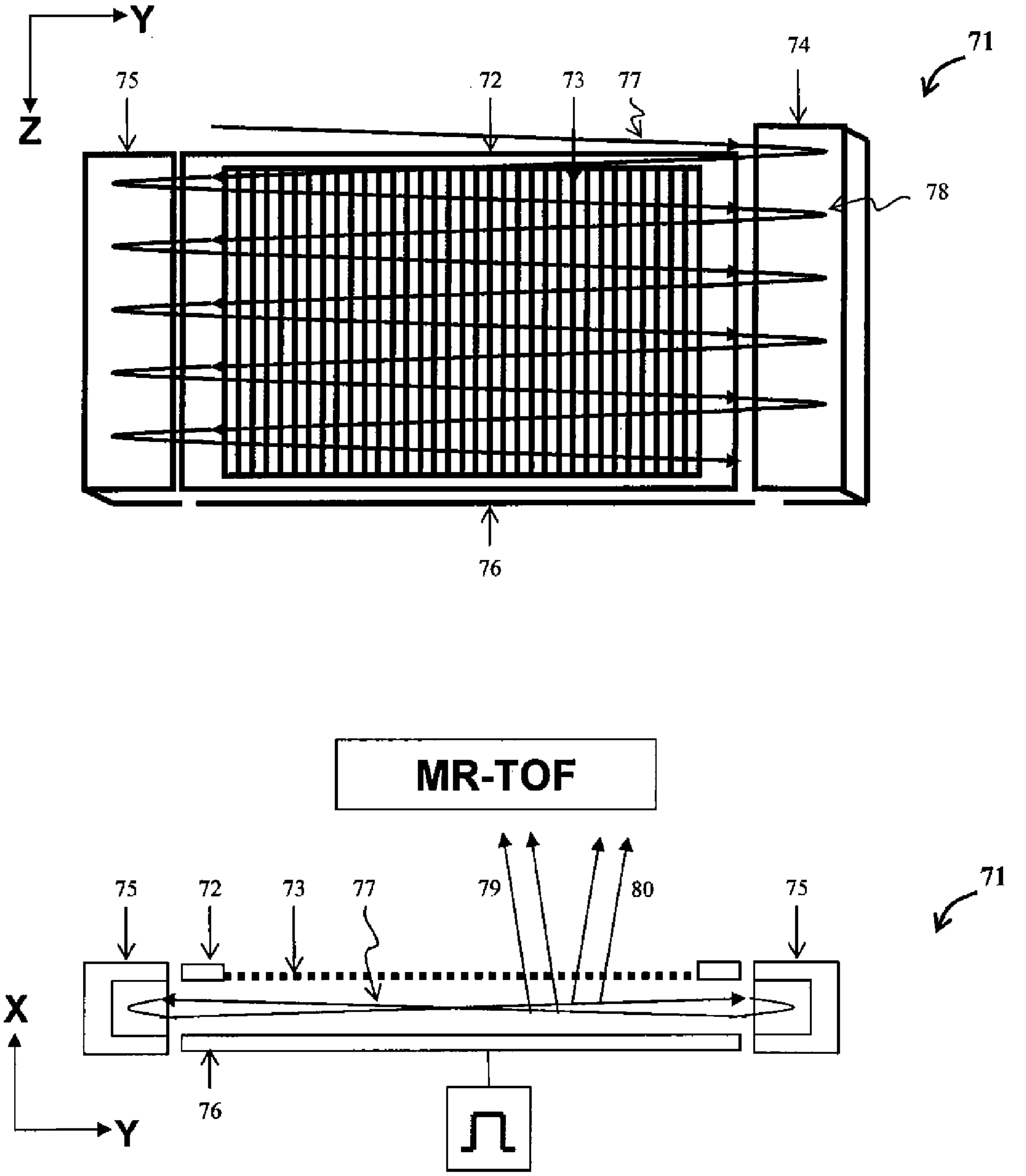
FIG. 7 shows a schematic of an orthogonal accelerator with ion trapping in a planar electrostatic trap.

Referring to FIG. 7, a particular example is shown of an orthogonal accelerator with an electrostatic trap, which may comprise a top electrode 72 with a wire mesh 73, two planar electrostatic reflectors 74 and 75 and a bottom electrode 76. Those electrodes form a miniature multi-reflecting system.

In operation, the ion beam 77 is introduced at a small angle to the Y-axis. The mirror 74 is preferably shifted along the Z-axis to reflect the ion beam. The shape and potential of the electrodes are selected to provide periodical spatial focusing in the X-direction. Ions bounce between mirrors in the Y-direction while slowly drifting in the Z-direction, and this way form a jig-saw ion trajectory 78. As a result, ions spend a prolonged time within the accumulation region, which is increased proportionally to the number of bounces. An optional deflector may be installed at one end to revert direction of the drift, thus further increasing ion residence time in the accelerator. Periodically, an electric pulse is applied to the bottom electrode 76 and ions get ejected through the mesh 73 while forming ion packets 79 and 80, traveling in two directions (each direction corresponds to the Y-direction of ion velocity at the time of the pulse).

Note that the second half of the ion beam (trajectories 79) may also be utilized in many different ways. It could be directed onto a supplementary detector to monitor the total ion beam intensity. It could be introduced into the MR-TOF via a different set of lenses to follow a different ion path, for example, for high resolution analysis of a selected narrow mass range. Alternatively, both ion trajectories 79 and 80 could be merged by a more elaborate lens system for the main analysis in the MR-TOF MS.

The suggested method of extending the residence time within the accelerator may employ different types of electrostatic traps, including (but not limited to):

- Individual or a set of wires with orbital motion of the ions around them;
- A trap formed by a space charge of an electron beam or a beam of negative ions in the case of trapping positive ions; and
- A channel with alternating static potentials formed by plates, rods or wires. In this particular case, a very slow ion beam can be introduced into the channel, thus increasing ion residence time within the accelerator, which improves the duty cycle of the accelerator.

Figure 8:
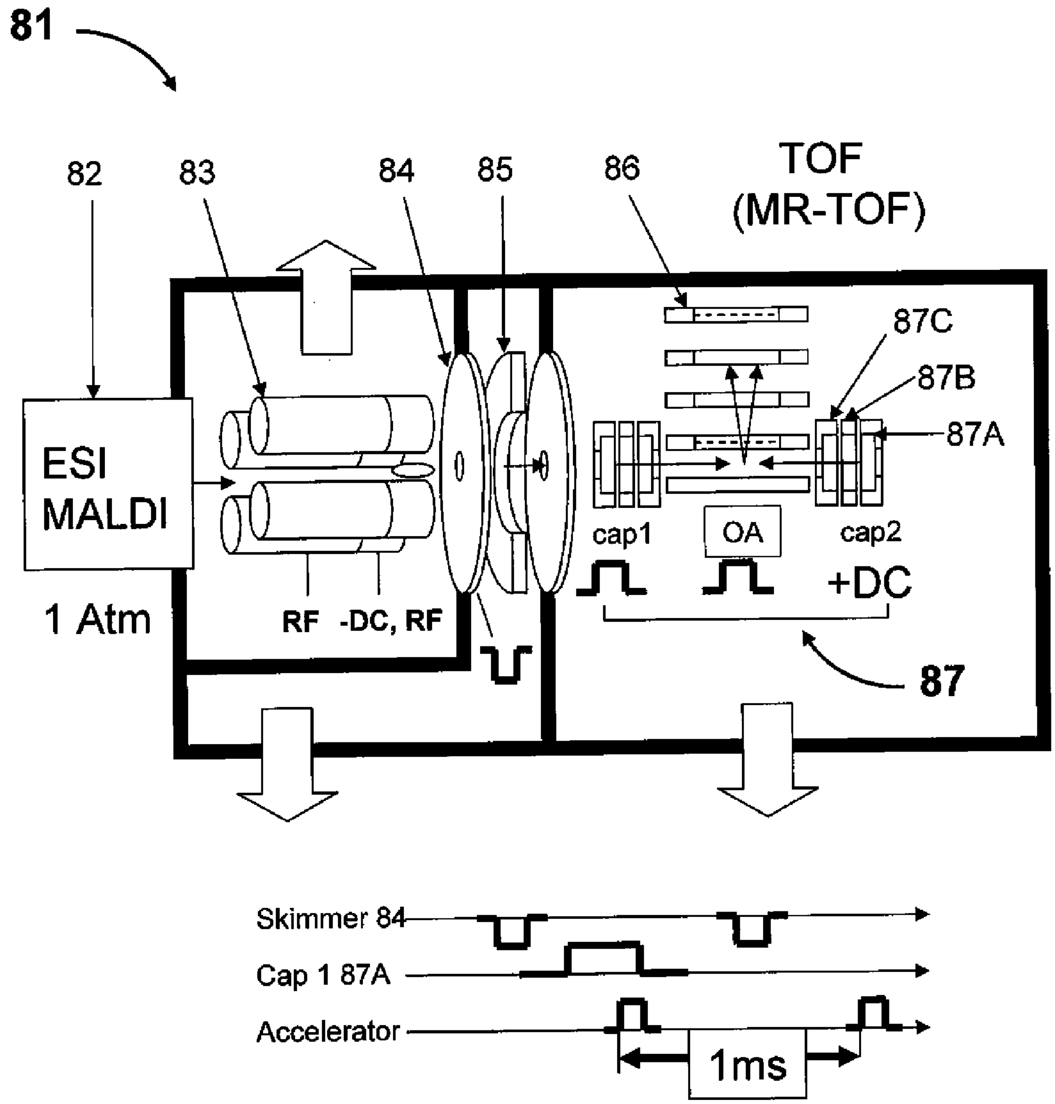
FIG. 8 shows a schematic of an orthogonal accelerator with ion trapping in an axially symmetric electrostatic trap.

Yet another way of using an electrostatic trap within the orthogonal accelerator is combining it with a linear ion trap for preliminary ion storage. Referring to FIG. 8, the interface 81 between a continuous ion source 82 (e.g., ESI or gaseous MALDI) and a TOF analyzer comprises a linear ion trap 83, optional transfer lenses 85 and an electrostatic trap 87 incorporated into the orthogonal accelerator 86. The electrostatic trap is formed by two caps (cap 1 and cap 2) which are coaxial sets of axially symmetric electrodes shown in FIG. 8 as 87A, 87B and 87C. Optionally, one of the electrodes in each set (e.g., 87B) forms a lens for periodic ion focusing within the trap.

In operation, ions are generated in a continuous or quasi-continuous ion source 82, and are then passed into a linear ion trap 83. The linear trap 83 is formed out of an RF multi-polar ion guide, preferably having a minimum of DC potential near the exit of the linear trap. Periodically, the linear trap 83 ejects ions at moderate energy, for example, 10-30 eV, e.g., by lowering potential of the skimmer 85. Ion packets then get into an electrostatic trap 87, formed by two caps (cap 1 and cap 2) and an equipotential gap of the orthogonal accelerator (OA) 86. Each cap is formed out of a few (2-3) electrodes. At the injection stage, at least an outer electrode 87A of the cap 1 is lowered to transfer ion packets of various mass to charge ratio m/z. Once the heaviest species of interest pass through the pulsed electrode of cap 1, then cap 1 is brought to reflecting stage. Ions become trapped within an electrostatic trap 87. The caps act as ion reflectors with a weak spatial focusing providing by a lens electrode 87B, somewhat similar to multi-reflecting TOFs. Fields are tuned to provide indefinite confinement of ions with spatial focusing but to avoid time-of-flight focusing with respect to ion energy. The trapping stage lasts for long enough (hundreds of microseconds), such that ions of every mass-to-charge ratio get distributed along the trap due to a small longitudinal velocity spread in ion packets.

Figure 9:
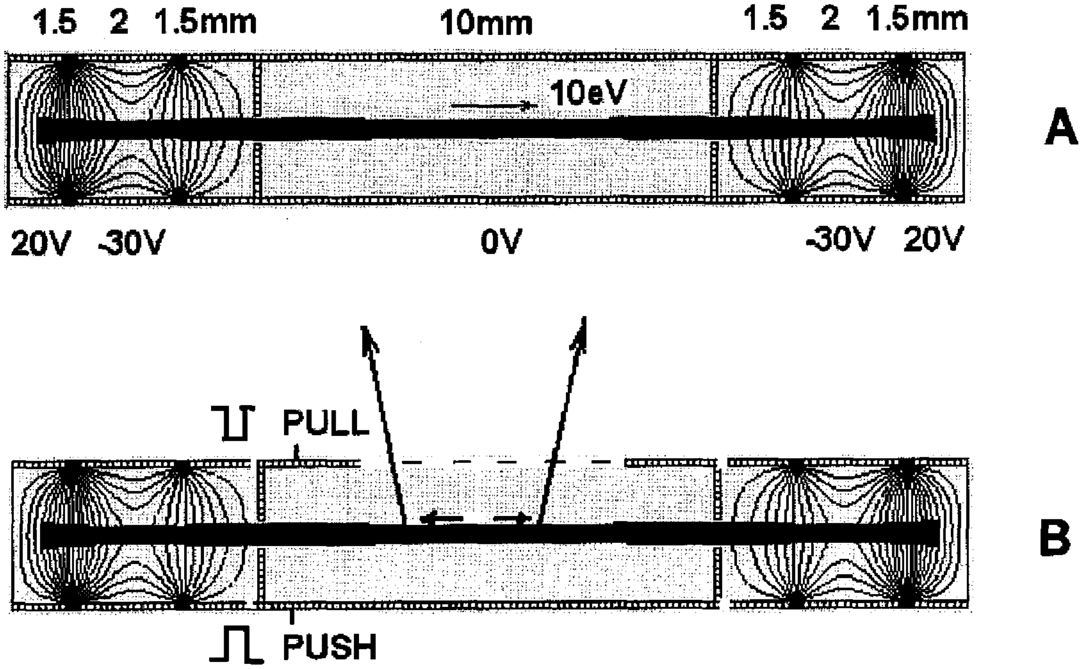
FIG. 9 shows examples of ion envelopes and equipotential lines within the axially symmetric electrostatic trap.

Referring to FIG. 9A, an example of ion optics simulation of one particular example of the miniature electrostatic trap is given. The figure presents trap dimensions and voltages on electrodes. Curved lines present simulated equipotentials and ion trajectories of ions flying with 1 deg divergence and 10 eV energy. Multiple trajectories overlap and form the solid bar presenting the envelope of the beam. Obviously, ions stay confined near the axis of the trap. Apertures at the inner side of the caps serve to limit space phase of the ion beam within the accelerator. Referring to FIG. 9B, after ions of all masses are spread along the trap, an ejection pulse is applied to electrodes of the orthogonal accelerator, and a portion of the trapped ions of all masses get extracted through a window of the accelerator. To reduce field distortions in the accelerator, the window could be either formed as a narrow slit or be covered by mesh. As shown in FIG. 9B, at the ejection stage, a push pulse is applied to the bottom plate and a pull pulse is applied to the top plate. Ions get ejected via a window in the top plate and get injected into a time-of-flight mass spectrometer, preferably a multi-reflecting mass spectrometer or a multi-pass mass spectrometer. Right before the ejection, ions travel in both directions along the axis of the trap. Hence, after the orthogonal acceleration, there will be formed two distinct packets, different by their trajectory angle. The TOF analyzer may either remove one of them by stops or can use both beams, e.g., directing them to different detectors or via different lens systems.

The inventors' own simulations suggest that the system provides conversion of continuous ion beam into ion packets with the following estimated characteristics:

- At least one decade of the mass range,
- No mass discrimination within the range,
- At least 5% duty cycle when using short (6 mm) packages for multi-reflecting time-of-flight analyzers, and
- Most important, the converter does not limit the period of MR-TOF pulses.

Initial parameters of the ions appear to be well controlled within a small phase space volume. In one particular example, trapped ions have less than 1 mm thickness of trapped ion ribbon and less than 1 deg characteristic width of angular divergence profile. This is expected to substantially improve time and energy spread of ejected ion packets.

The above-described methods and apparatuses for improving the duty cycle of the orthogonal accelerator in a multi-reflecting TOF MS are logically connected and could be combined in multiple combinations mutually enhancing each other.

A combination of all measures, includes:

a) Orientation of the ion beam across the trajectory plane, optionally complemented by a steering method of wide ion packets while minimizing time distortions;

b) Velocity modulation within the ion guide;

c) Prolonged residence time in the accelerator with an electrostatic trap or a radio frequency confined ion guide; and d) Micro-machining of the ion trap or ion guide.

All lead to a very high duty cycle, approaching 50 to 100% for ions in a wide range of m/z, a larger flight path of the MR-TOF and better parameters of the ion packets, thereby improving resolution of the MR-TOF.

The above methods and apparatuses are well compatible with a variety of pulsed and quasi-continuous and continuous ion sources, including ESI, APPI, APCI, ICP, EI, CT, MALDI in vacuum and at intermediate gas pressure. The method provides an improved signal, which helps accelerate the acquisition of meaningful data at a faster rate. The pulsing rate of MR-TOF-1 kHz is not an obstacle for combining the mass spectrometer with fast separating techniques, such as LC, CE, GC and even faster two-dimensional separations such as LC-LC, LC-CE and GC-GC.

The described mass spectrometer is also well suited for various MS-MS tandems, wherein a first separating device is a quadrupole, a linear ion trap with radial or axial ion ejection, or an ion mobility spectrometer, etc. The tandem may include various reaction cells including: a fragmentation cell; an ion-molecular, ion-ion, or ion-electron reactor; or a cell for photo dissociation.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A multi-reflecting time-of-flight mass spectrometer (MR-TOF MS), sequentially comprising:
- an ion source for generating an ion flow;
- an interface accepting the ion flow and converting the ion flow into a continuous or quasi-continuous ion beam;
- an orthogonal accelerator to convert the ion beam into ion packets; and
- a planar multi-reflecting analyzer providing multiple reflections of the ion packets between planar grid-free mirrors, thus passing ions along a jig-saw ion trajectory lying within an analyzer trajectory plane,
- wherein a tilt angle between the ion beam and the normal direction to the analyzer trajectory plane is less than 10 degrees.

2. The MR-TOF MS as in claim 1, further comprising an ion deflector to steer ion packets, wherein the direction and energy of the ion beam and, correspondingly, the angle of ion steering, are adjusted to compensate time distortions introduced by ion steering.

3. The MR-TOF MS as in claim 1, wherein said ion source is one of: ESI, APPI, APCI, ICP, EI, CI, SIMS, vacuum MALDI, atmospheric MALDI, MALDI at an intermediate gas pressure, a fragmentation cell of tandem mass spectrometer, and an ion reaction cell of tandem mass spectrometer.

4. A multi-reflecting time-of-flight mass spectrometer (MR-TOF MS), comprising:
- an ion source for generating an ion beam;
- an orthogonal accelerator to convert the ion beam into ion packets;
- an interface for ion transfer between said ion source and said orthogonal accelerator; and
- a planar multi-reflecting analyzer providing multiple reflections of the ion packets within a jig-saw trajectory plane, wherein the angle between said ion beam and a normal to said trajectory plane is less than 10 degrees.

5. The MR-TOF MS as in claim 4, wherein the angle between said ion beam and a normal to said trajectory plane is less than 5 degrees.

6. The MR-TOF MS as in claim 5, wherein the angle between said ion beam and a normal to said trajectory plane is less than 3 degrees.

7. A multi-reflecting time-of-flight mass spectrometer (MR-TOF MS), comprising:
- an ion source for generating an ion beam;
- an orthogonal accelerator to convert the ion beam into ion packets;
- an interface for ion transfer between said ion source and said orthogonal accelerator; and
- a planar multi-reflecting analyzer providing multiple reflections of the ion packets within a jig-saw trajectory plane,
- wherein the ion beam past said interface is oriented substantially across said trajectory plane, wherein said planar multi-reflecting analyzer comprises a plurality of grid-free ion mirrors with a field-free space therebetween, and wherein a set of periodic lenses is provided in the field-free space.

8. A multi-reflecting time-of-flight mass spectrometer (MR-TOF MS), comprising:
- an ion source for generating a continuous ion flow;
- an orthogonal accelerator to convert the ion flow into ion packets;
- an interface for ion transfer between said ion source and said orthogonal accelerator; and
- a multi-reflecting analyzer providing multiple reflections of the ion packets within electrostatic fields,
- wherein said interface comprises a gas-filled radio frequency ion guide, said ion guide having means for periodic modulation of ion flow velocity for converting said continuous ion flow into a quasi-continuous ion flow without ion trapping.

9. The MR-TOF MS as in claim 8, further comprising a transfer channel in between said ion guide and said orthogonal accelerator, said transfer channel is connected to an accelerating voltage for rapid ion transfer below 50 μs.

10. The MR-TOF MS as in claim 8, wherein said ion source is one of: ESI, APPI, APCI, ICP, EI, CI, SIMS, vacuum MALDI, atmospheric MALDI, MALDI at an intermediate gas pressure, a fragmentation cell of tandem mass spectrometer, and an ion reaction cell of tandem mass spectrometer.

11. A multi-reflecting time-of-flight mass spectrometer (MR-TOF MS), comprising:
- an ion source for generating an ion beam;
- an orthogonal accelerator to convert the ion beam into ion packets;
- an interface for ion transfer between said ion source and said orthogonal accelerator; and
- a multi-reflecting analyzer providing multiple reflections of the ion packets within electrostatic fields,
- wherein said orthogonal accelerator comprises an electrostatic trap for trapping ions within an electrostatic field.

12. The MR-TOF MS as in claim 11, wherein said ion source is one of: ESI, APPI, APCI, ICP, El, CI, SIMS, vacuum MALDI, atmospheric MALDI, MALDI at an intermediate gas pressure, a fragmentation cell of tandem mass spectrometer, and an ion reaction cell of tandem mass spectrometer.

13. A multi-reflecting time-of-flight mass spectrometer (MR-TOF MS), comprising:
- an ion source for generating an ion beam;
- an orthogonal accelerator to convert the ion beam into ion packets;

an interface for ion transfer between said ion source and said orthogonal accelerator; and a multi-reflecting analyzer providing multiple reflections of the ion packets within electrostatic fields, wherein said orthogonal accelerator comprises an electrostatic trap, wherein said electrostatic trap comprises miniature multi-reflecting and grid-free ion mirrors separated by a drift space and a mesh or a slot on a side of the drift space, said elements are arranged such that the ion beam experiences multiple reflections between said ion mirrors before being extracted through said mesh or slot by electric pulse.

14. A multi-reflecting time-of-flight mass spectrometer (MR-TOF MS), comprising:

an ion source for generating an ion beam;

an orthogonal accelerator to convert the ion beam into ion packets;

an interface for ion transfer between said ion source and said orthogonal accelerator; and a multi-reflecting analyzer providing multiple reflections of the ion packets within electrostatic fields, wherein said orthogonal accelerator comprises an electrostatic trap, wherein said electrostatic trap comprises a pair of coaxial ion mirrors arranged around the orthogonal acceleration stage and said ion interface comprises a device for modulating ion beam intensity or an ion accumulating device.

15. A method of multi-reflecting time-of-flight mass spectrometry, comprising the steps of:

forming an ion beam;

forming ion packets by applying a pulsed electric field in a substantially orthogonal direction to the ion beam;

introducing the ion packets into a field-free space in between ion mirrors, the ion mirrors forming a substantially two-dimensional electric field, extended along a drift axis; and orienting the pulsed electric field substantially orthogonal to the drift (Z) direction such that the ion packets experience multiple reflections in an X direction combined with slow displacement along the drift direction, thus forming a jig-saw ion path within an X-Y trajectory plane of a Cartesian coordinate system having X, Y, and Z axes, wherein said ion beam travels non-parallel to the Y axis and at an angle less than about 10 degrees relative to the Y axis.

16. The method as in claim 15, further comprising a step of periodic focusing of ion packets in the drift direction and in between ion reflections in the ion mirrors.

17. The method as in claim 15, wherein the electric field of the ion mirrors is arranged to provide for high order spatial and time-of-flight focusing with respect to ion energy and to spatial and angular spread across the trajectory plane.

18. The method as in claim 15, further comprising a step of ion packet steering after the step of ion packet formation and wherein the orthogonal pulsed electric field is tilted to trajectory plane in order to compensate for time distortions introduced by the steering step.

19. The method as in claim 15, wherein said pulsed electric field is oriented at an angle relative to the trajectory X-Z plane.

20. The method as in claim 15, wherein said ion beam travels at an angle of less than 5 degrees from a normal to the trajectory plane.

21. The method as in claim 15, wherein said ion beam travels at an angle of less than 3 degrees from a normal to the trajectory plane.

22. The method as in claim 15, further comprising an additional step of sample separation in liquid phase prior to the step of ion beam formation.

23. The method as in claim 15, wherein the step of ion beam formation is made using one of: ESI, APPI, APCI, ICP, EI, CI, SIMS, vacuum MALDI, atmospheric MALDI, and MALDI at an intermediate gas pressure.

24. The method as in claim 15, wherein the method of analysis further comprises additional steps of ion mass separation and fragmentation after the step of ion beam formation.

25. A method of multi-pass time-of-flight mass spectrometry, comprising the steps of:

forming a continuous ion flow;

delivering the ion flow to a region of ion packet formation;

forming ion packets by applying a pulsed electric field in a substantially orthogonal direction to the ion flow direction; and introducing the ion packets into an electrostatic field of a multi-reflecting time-of-flight analyzer, such that the ion packets experience multiple reflections, wherein said step of ion beam delivery further comprises a step of time-modulating of ion flow velocity within an ion guide at an intermediate gas pressure for converting said continuous ion flow into a quasi-continuous ion flow without ion trapping, the modulation is synchronized to orthogonal electric pulses.

26. The method as in claim 25, further comprising a step of ion beam acceleration-deceleration for rapid transfer of said modulated ion beam to the orthogonal pulsed electric field.

27. The method as in claim 25, further comprising an additional step of sample separation in liquid phase prior to the step of ion flow formation.

28. The method as in claim 25, wherein the step of ion flow formation is made using one of: ESI, APPI, APCI, ICP, EI, CI, SIMS, vacuum MALDI, atmospheric MALDI, and MALDI at an intermediate gas pressure.

29. The method as in claim 25, wherein the method of analysis further comprises additional steps of ion mass separation and fragmentation after the step of ion flow formation.

30. A method of multi-pass time-of-flight mass spectrometry, comprising the steps of:

forming an ion beam;

delivering the ion beam to a region of ion packet formation;

forming ion packets by applying a pulsed electric field in an electrostatic trap in a substantially orthogonal direction to the ion beam; and introducing the ion packets into an electrostatic field of a multi-reflecting time-of-flight analyzer, such that the ion packets experience multiple reflections, wherein said step of ion beam delivery into said pulsed electric field of the electrostatic trap further comprises a step of ion trapping in an electrostatic field and wherein at least a portion of trapped ions remains in a region of pulsed acceleration.

31. The method as in claim 30, wherein the trapping electrostatic field of the electrostatic trap is planar and ions are injected through the edge of the field structure.

32. The method as in claim 30, wherein the trapping electrostatic field of the electrostatic trap is coaxial and ions are injected through a pulsed switched field.

33. The method as in claim 30, further comprising an additional step of sample separation in liquid phase prior to the step of ion beam formation.

34. The method as in claim 30, wherein the step of ion beam formation is made using one of ESI, APPI, APCI, ICP, EI, CI, SIMS, vacuum MALDI, atmospheric MALDI, and MALDI at an intermediate gas pressure.

35. The method as in claim 30, wherein the method of analysis further comprises additional steps of ion mass separation and fragmentation after the step of ion beam formation.

* * * * *